No. 792,611. PATENTED JUNE 20, 1905.
H. C. PORTER.
BATTERY GRID.
APPLICATION FILED AUG. 19, 1904

Witnesses:
J. B. Weir
Robert H. Weir

Inventor:
Henry C. Porter
by Raymond Barnett
his attorneys

No. 792,611.

Patented June 20, 1905.

UNITED STATES PATENT OFFICE.

HENRY C. PORTER, OF WAUKEGAN, ILLINOIS, ASSIGNOR TO EVANSVILLE BATTERY & ELECTRIC COMPANY, OF EVANSVILLE, INDIANA, A CORPORATION OF INDIANA.

BATTERY-GRID.

SPECIFICATION forming part of Letters Patent No. 792,611, dated June 20, 1905.

Application filed August 19, 1904. Serial No. 221,366.

*To all whom it may concern:*

Be it known that I, HENRY C. PORTER, a citizen of the United States, residing at Waukegan, in the county of Lake and State of Illinois, have invented certain new and useful Improvements in Battery-Grids, of which the following is a specification.

My invention relates to that particular type of electrical secondary or storage battery plates which are designated as the "Faure" or "pasted-plate" type. In storage batteries of this type much difficulty is encountered in providing means for holding the active material in constant intimate contact with the plate or grid. In charging and discharging the plate, with its mechanically-applied material, is subjected to marked expansion and contraction, and the metallic grid often warps or buckles, which tends to disintegrate the material and dislodge it from the support. This also causes the dislodged active material to accumulate upon the bottom of the cell and produces short-circuiting. In retaining the active material in place it is also essential to provide free circulation for the electrolyte to attack and act upon the active material. The cause of the warping or buckling of the grid is primarily the formation of a sulfate in the plugs of active material which fill the spaces between the parts of the grid, which causes the plugs to expand. As lead has little elasticity, the grid is forced out of shape. As usually constructed the edges of the grid are heavier than the intermediate portion, so that the effect of this distortion is to bulge the plate in the center.

My invention has for one object the provision of means whereby the active material or material to become active shall be firmly secured and held against dislodgment in the electrode under the influences of the charge and discharge and also to provide means for the free circulation of the electrolyte in and around the outer and subjacent exposed surfaces of the material.

A further object of my invention is the prevention of buckling of the plate, which is a frequent source of short-circuiting and consequent loss of electromotive force.

My invention is adapted to be used either as a positive or a negative plate.

These and such other objects as may hereinafter appear are attained by the devices shown in the accompanying drawings, in which—

Figure 1:
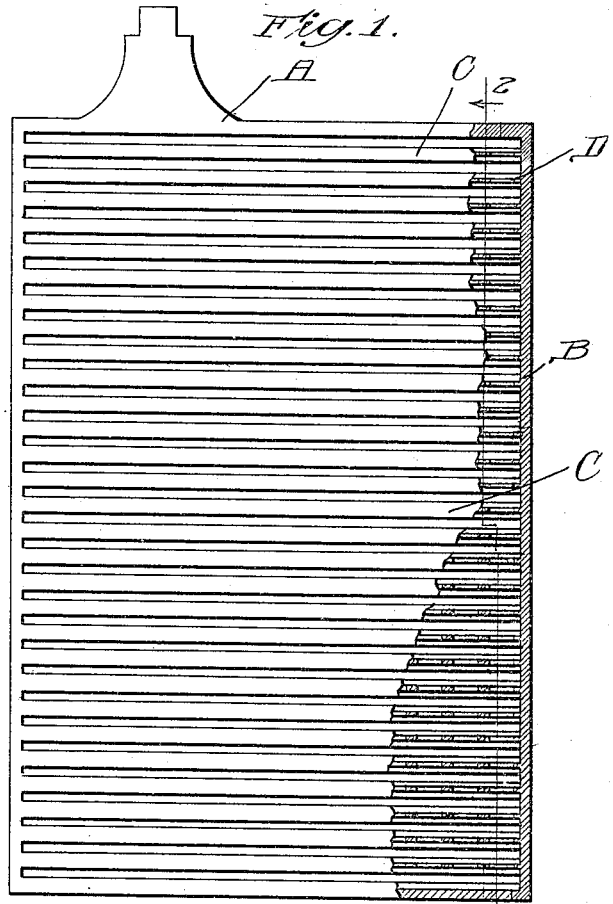
Figure 2:
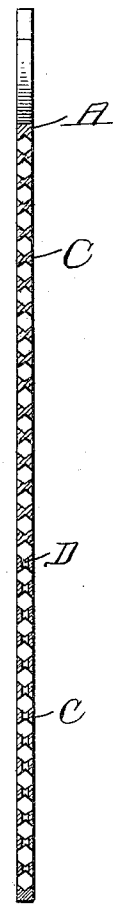
Figure 3:
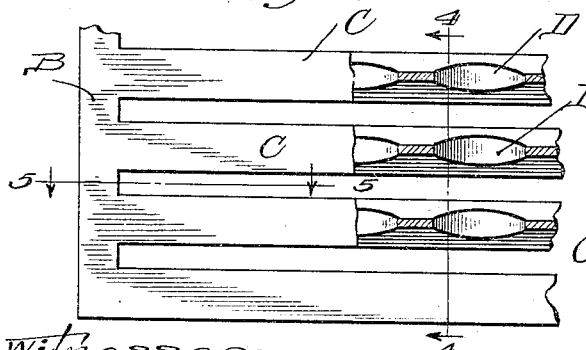
Figure 4:
Figure 5:
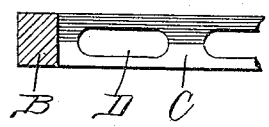

Figure 1 is an elevation of a grid of my improved type with a portion of the outer face broken away. Fig. 2 is a vertical section of Fig. 1 along the line 2 2 looking in the direction indicated by the arrows. Fig. 3 is an enlarged detail of one corner of the grid with a portion broken away. Fig. 4 is a vertical section of Fig. 3 along the line 4 4 looking in the direction indicated by the arrows, and Fig. 5 is a horizontal section of Fig. 3 on the line 5 5 looking in the direction indicated by the arrows.

Like letters of reference indicate the same parts in the several figures of the drawings.

Referring by letter to the accompanying drawings, A represents the body of the grid, which constitutes the support for the active material. This grid, which is constructed with solid edges B, is made up of a series of interior horizontal bars C, which while they may be of any desired shape are here shown as V-shaped on their upper and lower faces. These bars are provided at intervals with vertical openings D, which may be of any desired shape, but are here illustrated with two parallel sides and rounded ends. These openings in the bars may be formed in any relative position as regards each other; but I prefer to have corresponding openings in the different bars in the same vertical plane. By this method of construction I provide, in addition to the metallic grid, solid columns of active material or material to become active, forming, as it were, a supplemental grid of active material. This form of construction is such that while allowing a large amount of active material or material to become active to be always in contact with the grid and with the electrolytic fluid it prevents it to a great extent from dropping from the grid and its consequent accumulation at the bottom, with the resulting danger of short-circuiting. This construction also permits a greater degree of expansion of the active material when in contact with the electrolytic fluid without unduly warping the plate.

While I have illustrated one form of my invention, it is evident that other constructions are possible without departing from the spirit of my invention.

I claim—

1. A battery plate or grid comprising a plurality of integral bars having a series of openings therethrough, said openings being arranged to be filled with active material so that all the open spaces in said grid will be filled with a continuous body of active material.

2. A battery plate or grid, comprising end bars and a plurality of integral longitudinal bars, the longitudinal bars having a series of openings therethrough, said openings being arranged to be filled with active material so that the interior of said grid will be occupied by a continuous body of active material.

3. A battery plate or grid, comprising end bars and a plurality of integral longitudinal bars, said longitudinal bars having a series of vertical openings therethrough, said openings being arranged to receive active material whereby the active material between successive tiers of horizontal bars is connected to form a continuous body.

HENRY C. PORTER.

Witnesses:
F. H. DRURY,
O. R. BARNETT.